UNITED STATES PATENT OFFICE.

FRED G. BERESFORD, OF CORNING, CALIFORNIA, ASSIGNOR TO MAYWOOD PACKING CO., OF CORNING, CALIFORNIA, A CORPORATION OF CALIFORNIA.

PROCESS OF PREPARING OLIVES AND PRODUCT THEREOF.

1,154,363.   Specification of Letters Patent.   Patented Sept. 21, 1915.

No Drawing.   Application filed February 3, 1915.   Serial No. 5,895.

*To all whom it may concern:*

Be it known that I, FRED G. BERESFORD, a citizen of the United States, residing at Corning, in the county of Tehama and State of California, have invented new and useful Improvements in Processes for Preparing Olives and Product Thereof, of which the following is a specification.

My invention relates to a process for converting olives into a dehydrated, condensed and palatable and more nutritive form, suitable for transportation and consumption, and having certain dietetic and medicinal qualities of value, dependent upon the treatment.

It consists in first extracting the tannin or tannic acid with the slightly bitter and astringent principle contained in green or fresh olives by neutralizing the acid with a suitable alkali, and then washing and subjecting the product to a saline solution until palatable, after which the material is subjected to an artificial heat until deprived of moisture and converted into a desiccated product capable of dry packing and transportation.

In carrying out my invention, I take the olives in any desired condition of maturity, but preferably fully ripe, and, first, subject them to an alkaline solution for a sufficient time to neutralize the tannin or tannic acid and astringent principle which is a constituent of this fruit. The fruit is then leached and washed to remove the alkali and is submerged in, or otherwise subjected to, a saline solution of suitable character until it becomes palatable, after which the fruit is washed and deprived of surplus moisture, and finally dried or dehydrated until it assumes a form resembling the shrunken condition of dried raisins, in which condition the fruit is ready for dry packing in cartons or otherwise. In this condition I have found the fruit to contain valuable dietetic and medicinal qualities not characteristic of the fruit when prepared by other processes. The drying produces a hardened, impervious skin or envelop which concentrates and retains the oil and prevents softening and deterioration of the fruit.

For an alkaline solution I preferably employ approximately one ounce of potassium or sodium hydroxid to a gallon of water, although practice shows that these proportions may be varied and still obtain good results; it requiring however, a longer or shorter application of the neutralizing agent according to the strength of the solution. With the strength above specified, the fruit is subjected to treatment varying from 12 to 48 hours; the time depending upon the period it takes to extract the bitter qualities from the olives; care being taken not to break down the wall cells of the fruit. It is for this reason that a weak solution is preferred.

The saline solution is a common salt solution; it being usual to first employ a solution of 4 Baumé test leaving the olives in this from 3 to 4 days. Then I raise the solution to a 6 Baumé test and leave the fruit in it for 2 or 3 days. I may then increase the strength of the solution slightly until it is about 15 Baumé, which is considered palatable by most people.

Different fruit and different qualities of taste will vary the proportions and steps more or less, but the foregoing may be considered a good standard practice, based on practical experience.

Having thus described my invention, what I claim and desire to secure by Letters Patent is—

1. The process of preparing olives consisting in first subjecting them to an alkaline solution to neutralize the acid and astringent qualities, washing and subjecting the product to a saline solution until permeated thereby, and finally drying and desiccating the fruit to an arid, anhydrous condition.

2. As an article of manufacture, olives submitted successively to alkaline and saline solutions and finally dehydrated to an approximately anhydrous and desiccated condition.

In testimony whereof I have hereunto set my hand in the presence of two subscribing witnesses.

FRED G. BERESFORD.

Witnesses:
W. W. HEALEY,
W. T. RAUCEL.